(12) United States Patent
Xiong et al.

(10) Patent No.: US 11,327,679 B2
(45) Date of Patent: May 10, 2022

(54) METHOD AND SYSTEM FOR BITMAP-BASED SYNCHRONOUS REPLICATION

(71) Applicant: EMC IP Holding Company LLC, Hopkinton, MA (US)

(72) Inventors: Tianfang Xiong, Shanghai (CN); Wai Yim, Merrimack, NH (US); Yifeng Lu, Shanghai (CN); Yue Yang, Beijing (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

(21) Appl. No.: 16/778,022

(22) Filed: Jan. 31, 2020

(65) Prior Publication Data

US 2021/0240348 A1 Aug. 5, 2021

(51) Int. Cl.
*G06F 3/06* (2006.01)
*G06F 16/22* (2019.01)

(52) U.S. Cl.
CPC .............. *G06F 3/065* (2013.01); *G06F 3/064* (2013.01); *G06F 3/0619* (2013.01); *G06F 3/0673* (2013.01); *G06F 16/2237* (2019.01)

(58) Field of Classification Search
CPC ........ G06F 3/065; G06F 3/064; G06F 3/0619; G06F 3/0673; G06F 16/2237
See application file for complete search history.

(56) References Cited

U.S. PATENT DOCUMENTS

| | | | | |
|---|---|---|---|---|
| 6,665,780 B1* | 12/2003 | Bradley | .............. | G06F 11/2058 711/112 |
| 7,831,550 B1* | 11/2010 | Pande | .................... | G06F 16/27 707/610 |
| 10,565,062 B1* | 2/2020 | Rajaa | .................. | G06F 11/1451 |
| 2005/0050115 A1* | 3/2005 | Kekre | ................. | G06F 11/2071 |
| 2014/0279884 A1* | 9/2014 | Dantkale | .............. | G06F 16/182 707/620 |
| 2020/0183800 A1* | 6/2020 | Lyu | ..................... | G06F 11/2097 |

* cited by examiner

*Primary Examiner* — Hiep T Nguyen
(74) *Attorney, Agent, or Firm* — Krishnendu Gupta; Deepika Bhayana; Dorothy Wu Chiang

(57) ABSTRACT

A method is used for bitmap-based synchronous replication in a data protection system. The method includes, upon re-establishing communication with a first storage node, requesting, by a second storage node, a first bitmap from the first storage node. The method includes determining, by the second storage node, a set of data blocks to change on the first storage node based on the first bitmap and a second bitmap on the second storage node. The method also includes sending, by the second storage node to the first storage node, the set of data blocks.

20 Claims, 10 Drawing Sheets

METHOD AND SYSTEM FOR BITMAP-BASED SYNCHRONOUS REPLICATION

TECHNICAL FIELD

This application relates to bitmap-based synchronous replication in a data storage system.

DESCRIPTION OF RELATED ART

A data storage system is generally used for providing data storage and services. To prevent the storage system from failure and resulting in data loss, or to facilitate configuring the storage system proactively without suspending services, the storage system includes a primary storage node for providing service and a plurality of backup storage nodes for backing up data of the primary storage node. Some of the storage nodes are configured for real-time backup, updating synchronously whenever data on the primary storage node is updated, whereas other storage nodes are configured for regular backup, performing data backup operations on a periodic basis. Conventional techniques for synchronous replication of data from one storage node to another can be time-consuming, resource intensive, and inefficient.

SUMMARY OF THE INVENTION

One aspect of the current technique is a method for bitmap-based synchronous replication in a data storage system. The method includes, upon re-establishing communication with a first storage node, requesting, by a second storage node, a first bitmap from the first storage node. The method includes determining, by the second storage node, a set of data blocks to change on the first storage node based on the first bitmap and a second bitmap on the second storage node. The method also includes sending, by the second storage node to the first storage node, the set of data blocks.

In some embodiments, the data blocks corresponding to set bits in the first bitmap and set bits in the second bitmap are identified. The second storage node may merge the first bitmap and the second bitmap and identify the set of data blocks based on set bits in the merged bitmap. Bits in the second bitmap may be set based on the bits that are set in the first bitmap.

The set bits in the first bitmap may correspond to a first set of data blocks that are inconsistent between the first and second storage nodes. The set bits in the second bitmap may correspond to a second set of data blocks that are inconsistent between the first and second storage nodes.

The second storage node may receive confirmation from the first storage node that a data block in the set of data blocks has been stored on the first storage node. The second storage node may clear the bit in the second bitmap corresponding to the data block whose storage has been confirmed.

Another aspect of the current technique is a system, with a processor, for bitmap-based synchronous replication in a data storage system. The processor is configured to, upon re-establishing communication with a first storage node, request a first bitmap from the first storage node. The processor is further configured to determine a set of data blocks to change on the first storage node based on the first bitmap and a second bitmap on a second storage node. The processor is additionally configured to send the set of data blocks from the second storage node to the first storage node.

The processor may be configured to perform any other processes in conformance with the aspect of the current techniques described above.

BRIEF DESCRIPTION OF THE DRAWINGS

Features and advantages of the present technique will become more apparent from the following detailed description of exemplary embodiments thereof taken in conjunction with the accompanying drawings in which.

DETAILED DESCRIPTION OF EMBODIMENT(S)

Described below is a technique for bitmap-based synchronous replication in a data storage system, which technique may be used to provide, among other things, requesting, by a second storage node, a first bitmap from the first storage node, upon re-establishing communication with a first storage node. The technique may be used to provide determining, by the second storage node, a set of data blocks to change on the first storage node based on the first bitmap and a second bitmap on the second storage node. The technique may be used to provide sending, by the second storage node to the first storage node, the set of data blocks.

A data storage system can include multiple storage nodes. One storage node can function as a primary storage node and service I/O requests from customers. At least one other storage node can be a secondary storage node and store a copy of the data on the primary storage node. When the primary storage node updates its own data, the primary storage node may send changes to the data to the secondary storage node. In this manner, the secondary storage node may back up the primary storage node, in real-time, so that the data on the storage nodes remains synchronized with one another.

In various scenarios, the data on the storage nodes may fall out of synchronization. For example, the primary storage node may update some of its data and fail before successfully transmitting the updates to the secondary storage node for back-up. The storage nodes may become unable to communicate with one another. The primary storage node continues to service I/O requests and update its data, but the secondary storage node also begins servicing I/O requests, as well. As a result, both storage nodes store changes to data that are not propagated to the other storage node. Such discrepancies between the data on the storage nodes must be reconciled.

In at least some implementations in accordance with the techniques as described herein, the use of bitmap-based synchronous replication techniques in storage systems can provide one or more of the following advantages: reconciliation of discrepancies between data on storage nodes, reduced latency for synchronization, avoidance of large data transfers, and increased efficiency in use of storage space.

Figure 1:
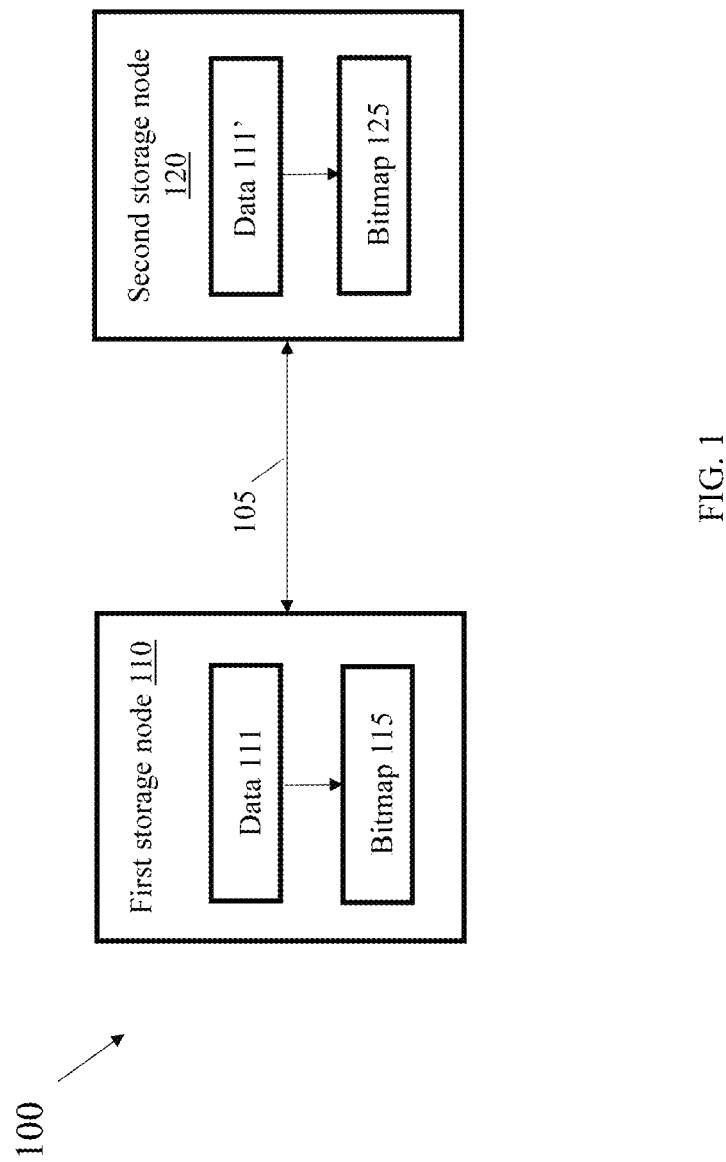
FIG. 1 is a schematic diagram illustrating a data storage system that may use the techniques described herein.

FIG. 1 is a schematic diagram illustrating a data storage system 100 that may use the techniques described herein. As shown in FIG. 1, the data storage system 100 includes storage nodes 110, 120, which each store a copy of data 111. One of the storage nodes 110, 120 serves customers by processing I/O requests. In the present disclosure, for ease of depiction, nodes 110, 120 are referred to as a first storage node and a second storage node, respectively. Those skilled in the art should understand that the above names are only used for distinguishing different nodes and do not limit the storage nodes themselves. Furthermore, the number of nodes is only illustrative, rather than being any limitation to embodiments of the present disclosure. The data storage system 100 may include more storage nodes, as would be appreciated by one of ordinary skill in the art.

The first and second storage nodes 110, 120 communicate over a communication medium 105 and attempt to remain synchronized with one another. In many scenarios, one storage node functions as the primary storage node and services I/O requests. As the secondary storage node, the other storage node backs up data on the primary storage node. When the primary storage node becomes incapable of providing service, the secondary storage node replaces the primary storage node to provide service. Furthermore, the storage node previously functioning as the primary storage node begins to back up the storage node now providing service.

When the first storage node 110 is the primary storage node, the first storage node 110 writes to its data 111 and updates the bit 116 in the bitmap 115 corresponding to the change in the data 111. The first storage node 110 transmits the change in the data 111 to the second storage node 120 and clears the corresponding bit 116, and the second storage node 120 updates its own data 111' accordingly. Similarly, when the second storage node 120 functions as the primary storage node, the second storage node 120 writes to its data 111' and updates the bit 126 in the bitmap 125 corresponding to the change in the data 111'. The second storage node 120 transmits the change in the data 111' to the first storage node 110 and clears the corresponding bit 126, and the first storage node 110 updates its own data 111 accordingly. In either situation, the secondary storage node backs up the primary storage node in real-time, i.e., synchronously.

The first and second storage nodes 110, 120 may be remote from one another, or may be local to one another by being located at a common site. The first and second storage nodes 110, 120 may communicate via a communication medium 105, such as a wide area network (WAN), although other types of networks are also adaptable for use with the present invention.

Figure 2:
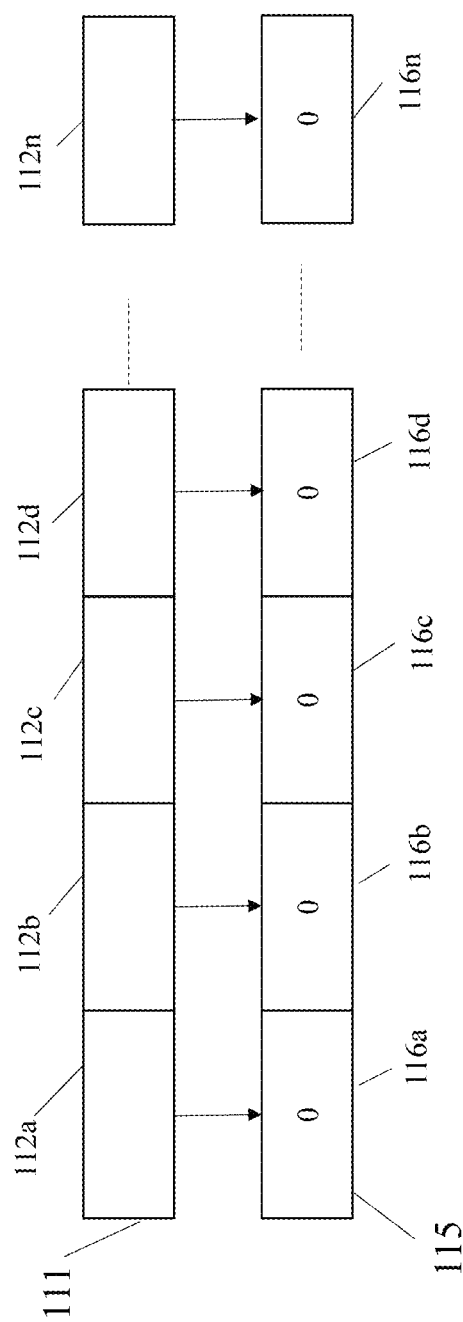
FIG. 2 is a schematic diagram illustrating the relationship between the data and the bitmap on the first storage node in the data storage system of FIG. 1.

FIG. 2 is a schematic diagram illustrating the relationship between the data 111 and the bitmap 115 on the first storage node 110 in the data storage system 100 of FIG. 1, although the data 111' and the bitmap 125 on the second storage node 120 may exhibit the same relationship. The data 111 includes data blocks 112a, 112b, . . . 112n (collectively, 112), and in many embodiments, each data block 112 is an extent of data. Each bit 116a, 116b, . . . 116n (collectively, 116), in the bitmap 115 corresponds to a data block 112 in the data 111. The state of a bit 116 indicates whether the corresponding data blocks 112, 112' on the first and second storage nodes 110, 120 are in sync. For example, if a bit 116 is "0", then any change to a data block 112 on the first storage node 110 has been propagated to the corresponding data block 112' on the second storage node 120. However, if a bit 116 is "1", the corresponding data block 112 has been changed, but the second storage node 120 has not yet updated its data 111' or the first storage node 110 has not yet received confirmation of the update.

Figure 3:
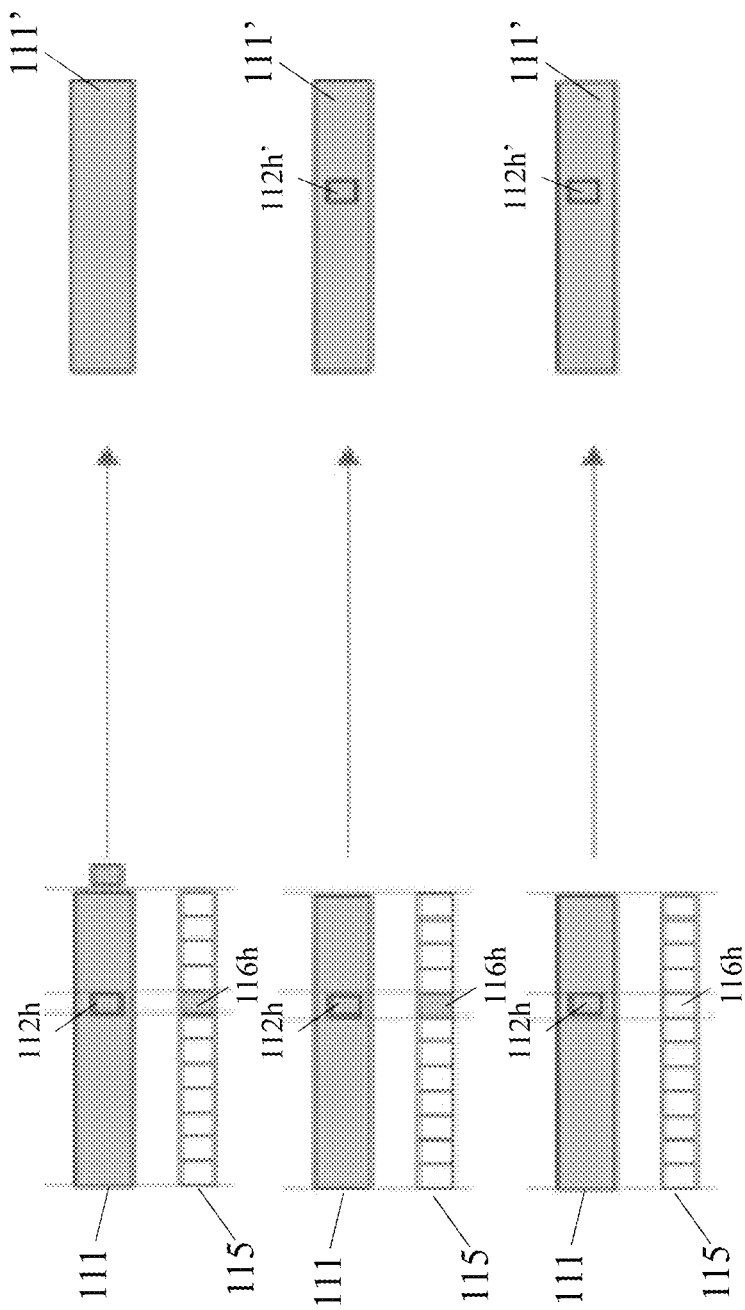
FIG. 3 is a schematic diagram illustrating how the primary storage node of the data storage system of FIG. 1 may update the secondary storage node, using bitmap-based synchronous replication.

FIG. 3 is a schematic diagram illustrating how the primary storage node may update the secondary storage node using bitmap-based synchronous replication. In this scenario, the first storage node 110 is the primary storage node 110. The first storage node 110 writes to a data block, such as data block 112h, and sets the corresponding bit 116h in the bitmap 115 from "0" to "1" to indicate that the data block 112h has been updated. Set bits are referred to herein as "dirty". To synchronize the second storage node 120 with the first 110, the first storage node 110 sends a copy of the change to the data block 112h, and the second storage node 120 updates data block 112h' accordingly. After receiving confirmation from the second storage node 120 that the changed data has been written to data block 112h', the first storage node clears the corresponding bit 116h in the bitmap 115.

In many scenarios, the first storage node 110 has updated several data blocks 112 in its data, so as to set several bits 116 in its bitmap 115. The first storage node 110 proceeds through the set bits 116 in its bitmap 115, transmitting the corresponding updated data block 112 to the second storage node 120, receiving confirmation that the update has been propagated to the data 111', and then clearing the corresponding bit 116. When the first storage node 110 finishes clearing its bitmap 115, the two storage nodes 110, 120 are in sync. The second storage node 120 behaves in a similar manner when functioning as the primary storage node and backing up its data 111' via the first storage node 110.

When one storage node operates as the primary storage node and the other operates as the secondary storage node, only one storage node receives write requests from customers. As a result, all data changes occur on one storage node before being propagated to the other, and the data on the storage nodes remain consistent. However, in various scenarios, as will be described below, more than one storage node receives write requests such that the data between the storage nodes 110, 120 becomes inconsistent.

Figure 4:
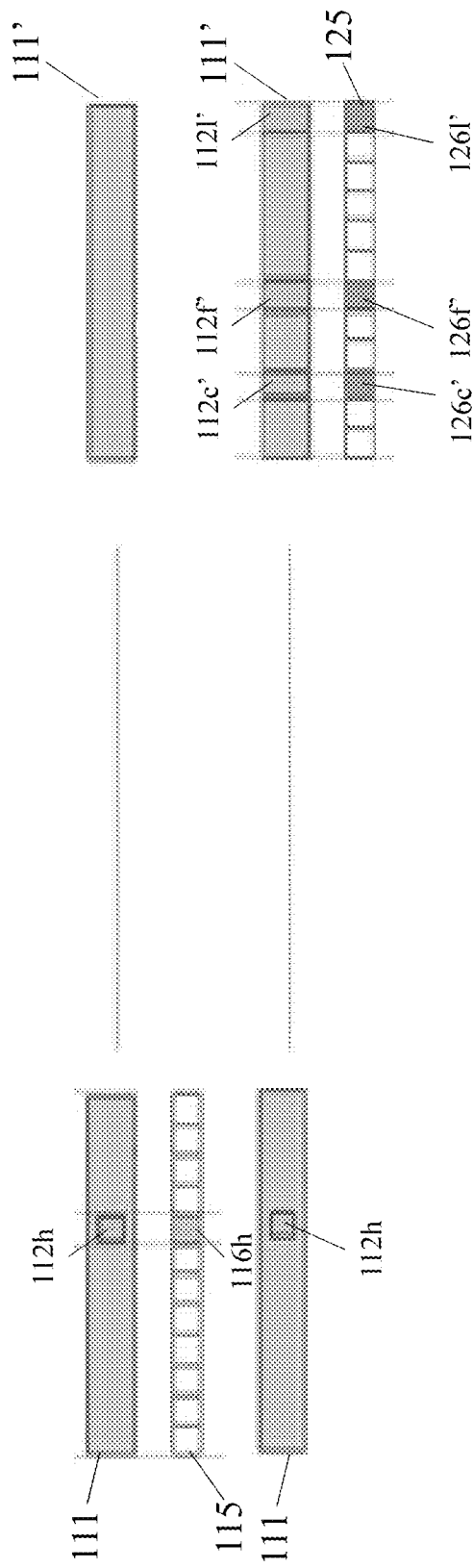
FIG. 4 is a schematic diagram illustrating an exemplary scenario in which the data on two storage nodes may become inconsistent.

FIG. 4 is a schematic diagram illustrating an exemplary scenario in which the data on two storage nodes 110, 120 may become inconsistent. In this scenario, the first storage node 110 operates as the primary storage node and receives a write request to data block 112h. The first storage node 110 stores the new data in data block 112h and sets the corresponding bit 116h in the bitmap 115. Then, the first storage node 110 becomes unavailable before sending the updated data 112h to the second storage node 120.

The first storage node 110 may become unavailable for various reasons. The first storage node 110 may fail. Alternatively, the first storage node 110 may be taken offline for reconfiguration (e.g., adjustments are made to the first storage node 110 in accordance with its workload). Moreover, the first and second storage nodes 110, 120 may become disconnected due to interruptions in service on the communication medium 105, by way of example.

In any of these scenarios, the first storage node 110 does not propagate the change in the data block 112*h* to the second storage node 120. As a result, the data block 112*h*' on the second storage node 120 is not updated, and becomes inconsistent with the data block 112*h* on the first storage node 110.

Furthermore, in these scenarios, the data storage system 100 performs failover such that the second storage node 120 becomes the primary storage node. As a result, the second storage node 120 begins accepting and servicing I/O requests. In the example of FIG. 4, the second storage node 120 updates data blocks 112*c*', 112*f*, and 112*l*' in response to write requests, and sets bits 126*c*', 126*f*', and 126*l*' accordingly. Until the first storage node 110 becomes available again, the second storage node 120 continues to service I/O requests from customers and set the corresponding bits 126 in its bitmap 125.

Figure 5:
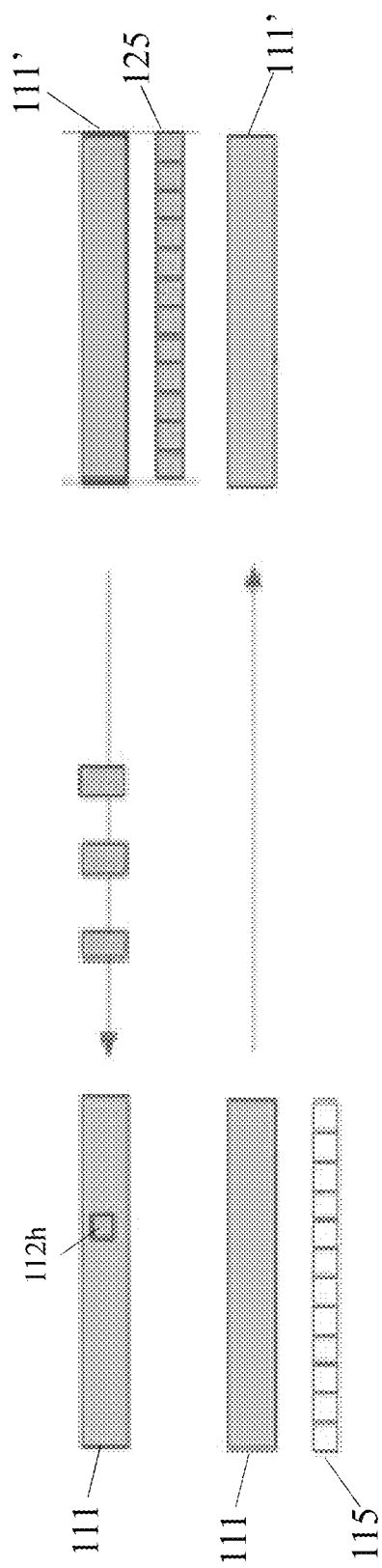
FIGS. 5 and 6 are schematic diagrams illustrating two problematic approaches to recovery.
Figure 6:
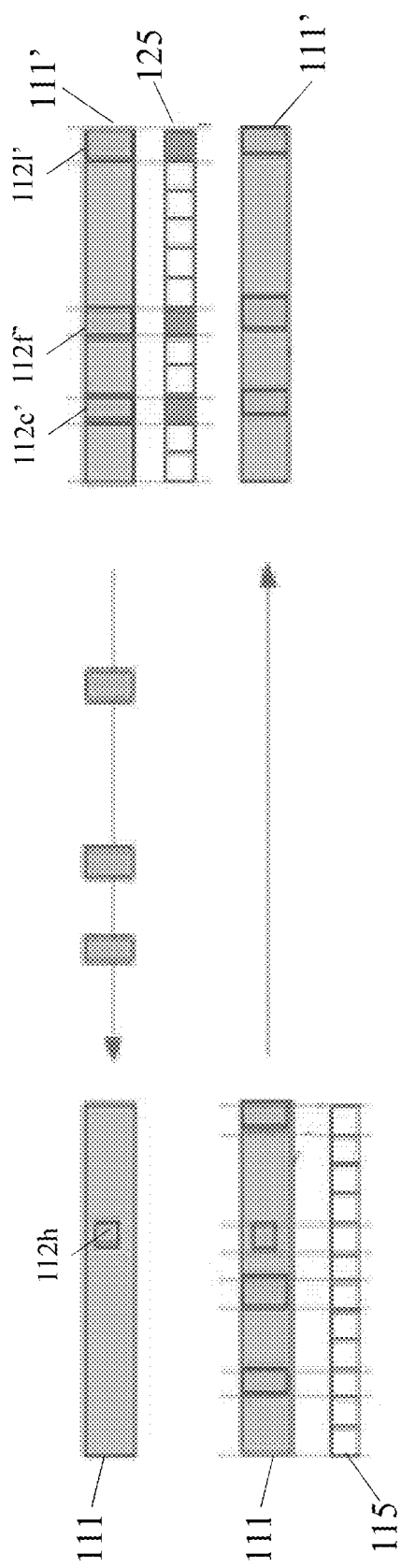

When the first storage node 110 becomes available, the data storage system 100 executes a recovery operation. FIGS. 5 and 6 are schematic diagrams illustrating two problematic approaches to recovery. In FIG. 5, the second storage node 120 executes a full synchronization, setting all of the bits 126 in its bitmap 125 and copying all of its data 111' over to the first storage node 110. After the second storage node 120 completes the operation, its clear bitmap 125 indicates that all of the data 111, 111' on the two storage nodes 110, 120 are in sync. However, full synchronization can be time consuming, requiring hours, and even days, to complete. Moreover, full synchronization can be inefficient and wasteful. The second storage node 120 transmits data blocks 112' that are already consistent with the corresponding data blocks 112 on the first storage node 110. Furthermore, the first storage node 110 allocates new storage space for such data blocks 112, even if first storage node 110 is already storing identical copies elsewhere.

In FIG. 6, the second storage node 120 copies to the first storage node 110 the updated data 112' that the second storage node 120 has received since becoming the primary storage node. The second storage node 120 proceeds through the set bits 126 in its bitmap 125, transmitting the updated data blocks 112' to the first storage node 110, receiving confirmation that the updates have been propagated to the data 111, and clearing the corresponding bits 126. However, because the first storage node 110 did not successfully update data block 112*h*' on the second storage node 120 before becoming unavailable, the data blocks 112*h*, 112*h*' remain inconsistent between the two storage nodes 110, 120.

Figure 7:
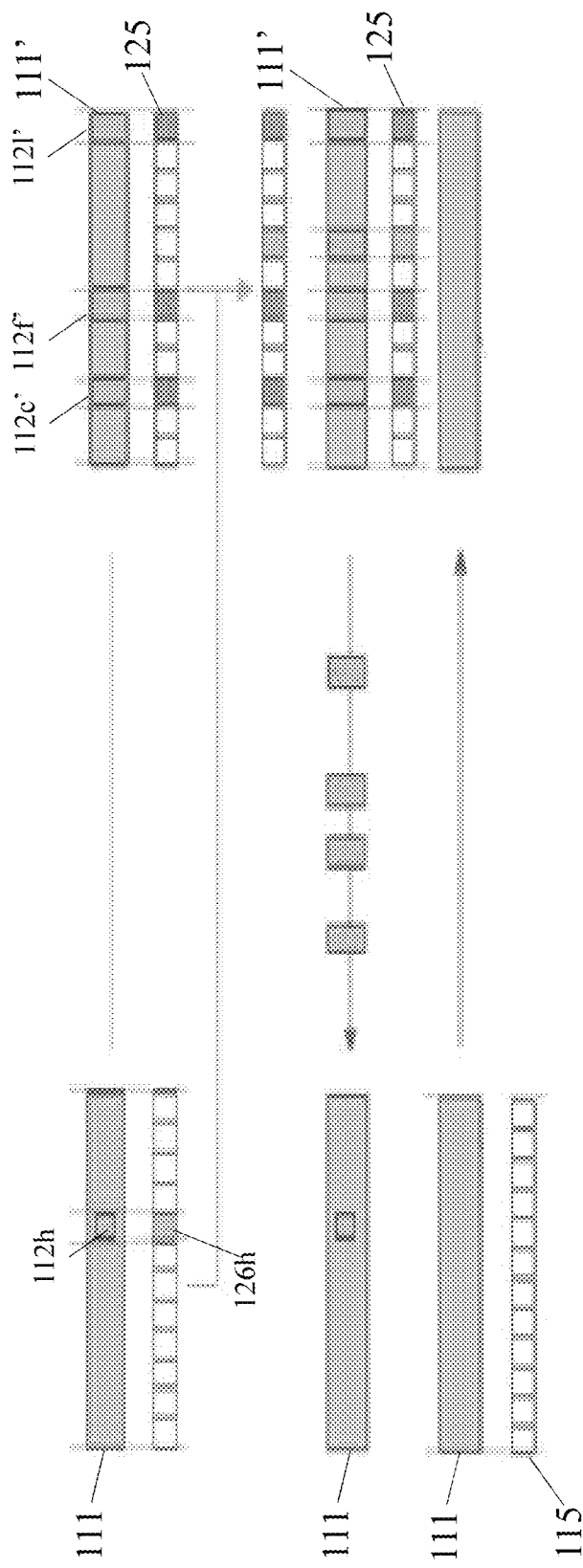
FIG. 7 is a schematic diagram illustrating bitmap-based synchronous replication to synchronize the data on two storage nodes.

FIG. 7 is a schematic diagram illustrating bitmap-based synchronous replication to synchronize the data on two storage nodes 110, 120. In this scenario, the first storage node 110 has updated data block 112*h* and set bit 116*h* in its bitmap 115, whereas the second storage node 120 has updated data blocks 112*c*', 112*f*, and 112*l*', and set bits 126*c*, 126*f*, and 126*l* in its bitmap 125. In this manner, the data contents of the first and second storage nodes 110, 120 have become inconsistent as one, or both, of the nodes have processed I/O requests from customers without updating the other storage node, accordingly.

When the first and second storage nodes 110, 120 become available to one another, the second storage node 120 requests the bitmap 115 from the first storage node 110. The second storage node 120 identifies dirty bits 116 in the received bitmap 115 and sets the corresponding bits 126 in its bitmap 125, thereby merging the two bitmaps 115, 125. In this manner, the second storage node 120 identifies the data blocks 112, 112' that are inconsistent between the two storage nodes 110, 120.

For each set bit 126 in the bitmap 125, the second storage node 120 transmits the corresponding data block 112' to the first storage node 110. When the first storage node 110 confirms that its data 111 has been updated with the received data block 112', the second storage node 120 clears the bit 126 for the reconciled data, and proceeds to the next set bit 126. In the example depicted in FIG. 7, the second storage node 120 transmits the data block 112*c*' corresponding to bit 126*c* and clears bit 126*c* after the first storage node 110 confirms that data block 112*c* has been successfully updated. The second storage node 120 then transmits the data block 112*f* corresponding to bit 126*f*, followed by the data blocks 112*h*' and 112*l*' corresponding to bits 126*h* and 126*l*, respectively. In this manner, the first storage node 110 overwrites its data blocks 112*c*, 112*f*, 112*h*, and 112*l* with the corresponding data blocks 112*c*', 112*f*, 112*h*', and 112*l*' so as to synchronize the data 111, data 111' on the two storage nodes 110, 120.

In the example depicted in FIG. 7, the second storage node 120 replicates its data 111' to the first storage node 120, and the first storage node 110 overwrites any data updated by write requests that the first storage node 110 received. However, in other embodiments, the first storage node 110 may replicate its data 111 to the second storage node 120. The first storage node 110 may request the bitmap 125 from the second storage node 120, merge the bitmap 125 with its own 115, and send data blocks 112 to the second storage node 120 to update and/or overwrite its data 111'.

The bitmap-based synchronous replication techniques described herein may be deployed in various scenarios. As discussed above, the first storage node 110, operating as the primary storage node, may be rendered inoperable by a disaster at the first storage node's 110 site. The first storage node 110 may have processed I/O requests, but failed to transmit copies of updated data blocks 111 to the second storage node 120 prior to becoming inoperable. The data system 100 executes failover such that the second storage node 120 begins to operate as the primary storage node. The second storage node 120 services I/O requests and updates its data 111' accordingly. Thus, the second storage node 120 accumulates changes to its data 111' while the first storage node 110 remains unavailable. When the first storage node 110 is restored, the data system 100 performs failback to reconcile the data 111, 111' on the first and second storage nodes 110, 120.

The second storage node 120 may request the bitmap 115 from the first storage node 110, merge the bitmap 115 with its own bitmap 125, and transmit data blocks 112' to the first storage node 110 to overwrite the corresponding blocks 112 in the data 111. After the second storage node 120 completes the synchronization, the first storage node 110 may resume operation as the primary storage node, receive I/O requests, and backup changes to its data 111' on the second storage node 120.

In another scenario, the communication medium 105 experiences interruptions in service. As a result, the first and second storage nodes 110, 120 cannot communicate with one another, but both storage nodes 110, 120 remain operable. The first storage node 110 continues to service I/O requests from customers, but the data system 100 executes failover such that the second storage node 120 also begins to service I/O requests, as well. Thus, the first and second storage nodes 110, 120 service I/O requests from different customers independently from one another, resulting in inconsistent data (a situation also referred to herein as "split-brain status"). When the communication medium 105 is restored, the first and second storage nodes 110, 120 resume communication. Then, one storage node overwrites data on the other storage node with its own data. Whether the second storage node 120 overwrites data 111 on the first storage node 110 or vice versa, the storage nodes 110, 120 execute the merged bitmap-based synchronous replication techniques described herein.

In another scenario, a system administrator pauses replication between the first and second storage nodes 110, 120, forcing both storage nodes 110, 120 to begin accepting I/O requests from customers. The system administrator may test either storage node 110, 120 to ensure the node 110, 120 would be robust against disaster (a situation also referred to herein as "disaster rehearsal"). When disaster rehearsal is complete, the system administrator may resume replication, and one storage node overwrites data on the other storage node with its own data, according to the techniques described herein.

Figure 8:
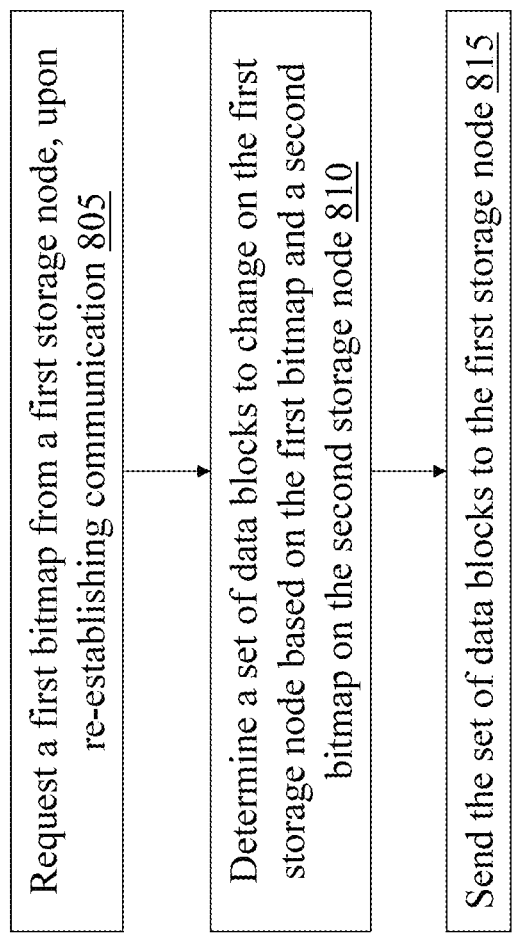
FIGS. 8, 9A, and 9B are flow diagrams depicting exemplary methods of bitmap-based synchronous replication, according to techniques described herein.

FIG. 8 is a flow diagram depicting an exemplary method of bitmap-based synchronous replication. The method includes upon re-establishing communication with a first storage node, requesting a first bitmap from the first storage node (step 805). The method also includes determining a set of data blocks to change on the first storage node based on the first bitmap and a second bitmap on the second storage node (step 810). The method also includes sending the set of data blocks to the first storage node (step 815).

Figure 9A:
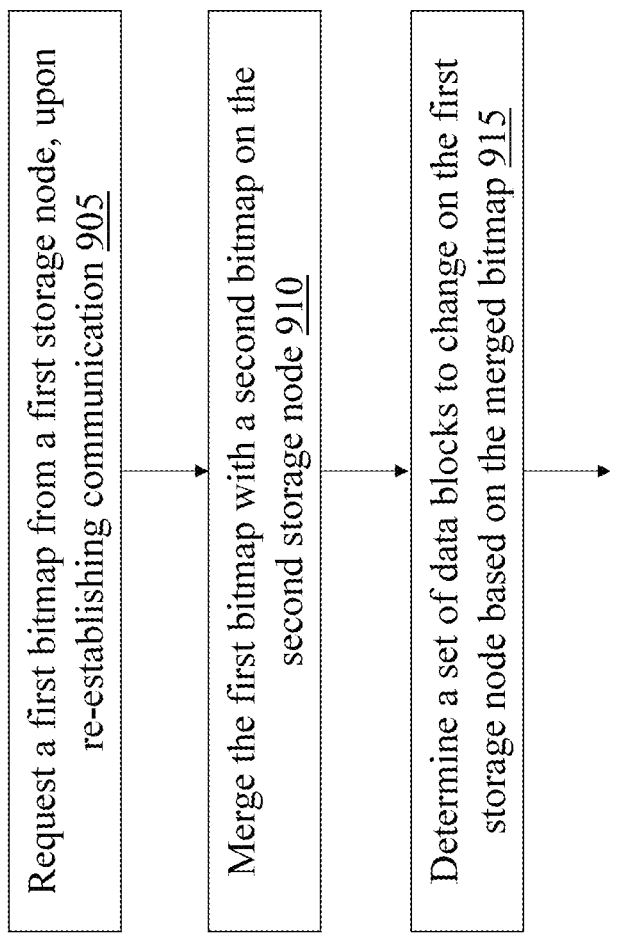
Figure 9B:
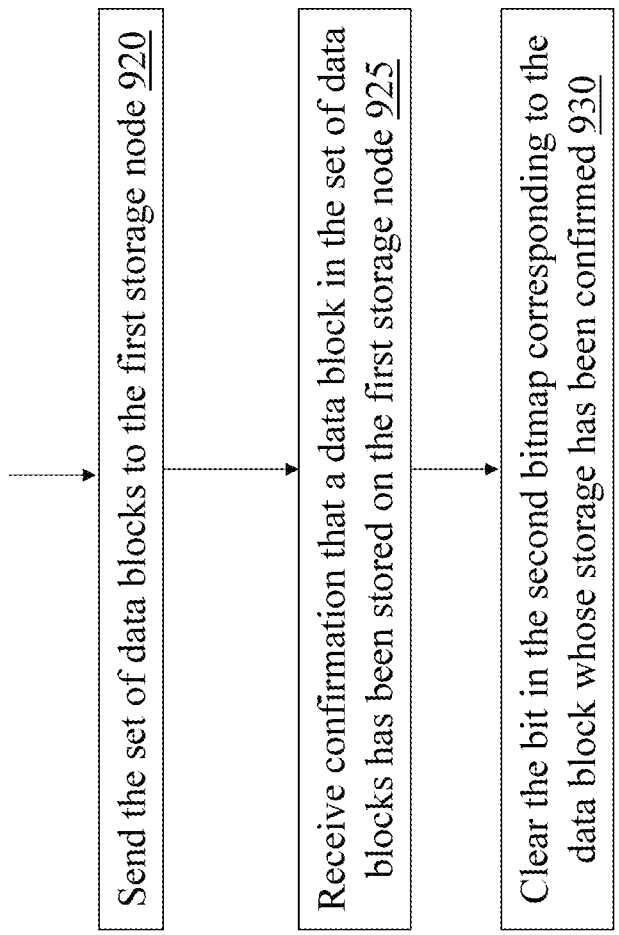

FIGS. 9A-9B is a flow diagram depicting another exemplary method of bitmap-based synchronous replication. The method includes upon re-establishing communication with a first storage node, requesting a first bitmap from the first storage node (step 905). The method also includes merging the first bitmap with a second bitmap on the second storage node (step 910). The bitmaps may be merged by setting bits on the second bitmap based on bits that are set on the first bitmap. The set bits in the first bitmap correspond to data blocks that are inconsistent between the first and second storage nodes, as do the set bits in the second bitmap. The method includes determining a set of data blocks to change on the first storage node based on the merged bitmap (step 915). The set of data blocks may correspond to the set bits in the merged bitmap. The method further includes sending the set of data blocks to the first storage node (step 920). The method also includes receiving confirmation that a data block in the set of data blocks has been stored on the first storage node (step 925). The method also includes clearing the bit in the second bitmap corresponding to the data block whose storage has been confirmed (step 930).

It should again be emphasized that the implementations described above are provided by way of illustration, and should not be construed as limiting the present invention to any specific embodiment or group of embodiments. For example, the invention can be implemented in other types of systems, using different arrangements of processing devices and processing operations. Also, message formats and communication protocols utilized may be varied in alternative embodiments. Moreover, various simplifying assumptions made above in the course of describing the illustrative embodiments should also be viewed as exemplary rather than as requirements or limitations of the invention. Numerous alternative embodiments within the scope of the appended claims will be readily apparent to those skilled in the art.

Furthermore, as will be appreciated by one skilled in the art, the present disclosure may be embodied as a method, system, or computer program product. Accordingly, the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present disclosure may take the form of a computer program product on a computer-usable storage medium having computer-usable program code embodied in the medium.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components, and/or groups thereof.

While the invention has been disclosed in connection with preferred embodiments shown and described in detail, their modifications and improvements thereon will become readily apparent to those skilled in the art. Accordingly, the spirit and scope of the present invention should be limited only by the following claims.

What is claimed is:

1. A method for bitmap-based synchronous replication in a data storage system, the method comprising:
    upon re-establishing communication with a first storage node, requesting, by a second storage node, a first bitmap from the first storage node, the first bitmap identifying data not replicated from the first storage node to the second storage node;
    determining, by the second storage node, a set of data blocks to change on the first storage node based on the first bitmap and a second bitmap on the second storage node, the second bitmap identifying data not replicated from the second storage node to the first storage node; and
    sending, by the second storage node to the first storage node, the set of data blocks so as to overwrite data blocks on the first storage node with the set of data blocks from the second storage node.

2. The method of claim 1, wherein determining the set of data blocks to change on the first storage node comprises:
    identifying data blocks corresponding to set bits in the first bitmap and set bits in the second bitmap.

3. The method of claim 1, wherein determining the set of data blocks to change on the first storage node comprises:
merging, by the second storage node, the first bitmap and the second bitmap; and
identifying, by the second storage node, the set of data blocks based on set bits in the merged bitmap.

4. The method of claim 3, wherein merging the first bitmap and the second bitmap comprises:
setting bits in the second bitmap based on the bits that are set in the first bitmap.

5. The method of claim 1, wherein set bits in the first bitmap correspond to a first set of data blocks that are inconsistent between the first and second storage nodes.

6. The method of claim 1, wherein set bits in the second bitmap correspond to a second set of data blocks that are inconsistent between the first and second storage nodes.

7. The method of claim 1, further comprising:
receiving, by the second storage node, confirmation from the first storage node that a data block in the set of data blocks has been stored on the first storage node; and
clearing, by the second storage node, the bit in the second bitmap corresponding to the data block whose storage has been confirmed.

8. A system for use in bitmap-based synchronous replication in a data storage system, the system comprising a processor configured to:
upon re-establishing communication with a first storage node, request a first bitmap from the first storage node, the first bitmap identifying data not replicated from the first storage node to the second storage node;
determine a set of data blocks to change on the first storage node based on the first bitmap and a second bitmap on a second storage node, the second bitmap identifying data not replicated from the second storage node to the first storage node; and
send the set of data blocks from the second storage node to the first storage node so as to overwrite data blocks on the first storage node with the set of data blocks from the second storage node.

9. The system of claim 8, wherein the processor is further configured to:
identify data blocks corresponding to set bits in the first bitmap and set bits in the second bitmap.

10. The system of claim 8, wherein the processor is further configured to:
merge the first bitmap and the second bitmap; and
identify the set of data blocks based on set bits in the merged bitmap.

11. The system of claim 10, wherein the processor is further configured to:
set bits in the second bitmap based on the bits that are set in the first bitmap.

12. The system of claim 8, wherein set bits in the first bitmap correspond to a first set of data blocks that are inconsistent between the first and second storage nodes.

13. The system of claim 8, wherein set bits in the second bitmap correspond to a second set of data blocks that are inconsistent between the first and second storage nodes.

14. The system of claim 8, wherein the processor is further configured to:
receive confirmation from the first storage node that a data block in the set of data blocks has been stored on the first storage node; and
clear the bit in the second bitmap corresponding to the data block whose storage has been confirmed.

15. One or more non-transitory computer-readable storage media to store instructions executable by one or more processors to perform operations comprising:
upon re-establishing communication with a first storage node, request, by a second storage node, a first bitmap from the first storage node, the first bitmap identifying data not replicated from the first storage node to the second storage node;
determine, by the second storage node, a set of data blocks to change on the first storage node based on the first bitmap and a second bitmap on the second storage node, the second bitmap identifying data not replicated from the second storage node to the first storage node; and
send, by the second storage node to the first storage node, the set of data blocks so as to overwrite data blocks on the first storage node with the set of data blocks from the second storage node.

16. The one or more non-transitory computer-readable storage media of claim 15, further comprising instructions executable by one or more processors to identify data blocks corresponding to set bits in the first bitmap and set bits in the second bitmap.

17. The one or more non-transitory computer-readable storage media of claim 15, further comprising instructions executable by one or more processors to:
merge, by the second storage node, the first bitmap and the second bitmap; and
identify, by the second storage node, the set of data blocks based on set bits in the merged bitmap.

18. The one or more non-transitory computer-readable storage media of claim 17, further comprising instructions executable by one or more processors to set bits in the second bitmap based on the bits that are set in the first bitmap.

19. The one or more non-transitory computer-readable storage media of claim 15, wherein set bits in the first bitmap correspond to a first set of data blocks that are inconsistent between the first and second storage nodes.

20. The one or more non-transitory computer-readable storage media of claim 15, further comprising instructions executable by one or more processors to:
receive, by the second storage node, confirmation from the first storage node that a data block in the set of data blocks has been stored on the first storage node; and
clear, by the second storage node, the bit in the second bitmap corresponding to the data block whose storage has been confirmed.

* * * * *